United States Patent [19]
Ko et al.

[11] Patent Number: 5,642,043
[45] Date of Patent: Jun. 24, 1997

[54] LINEAR POSITION SENSOR

[75] Inventors: Clyde Ko, Grand Rapids; Carl Munch, Reed City; David Shank; Peter H. Strom, both of Big Rapids, all of Mich.

[73] Assignee: Nartron Corporation, Reed City, Mich.

[21] Appl. No.: 690,029

[22] Filed: Jul. 31, 1996

Related U.S. Application Data

[63] Continuation of Ser. No. 69,127, May 28, 1993, abandoned, which is a continuation of Ser. No. 296,183, Jan. 11, 1989, Pat. No. 5,216,364.

[51] Int. Cl.$^6$ .................. G01B 7/14; H01F 21/02; G08C 19/06; G08C 19/12
[52] U.S. Cl. .................. 324/207.24; 324/207.22
[58] Field of Search .................. 324/207.13, 207.15, 324/207.16, 207.17, 207.22, 207.24, 225, 226, 239, 262; 340/870.31, 870.32, 870.33, 870.34, 870.35, 870.36; 336/30, 45, 73, 75, 77, 84 R, 130, 132, 133, 136

[56] References Cited

U.S. PATENT DOCUMENTS

| | | | |
|---|---|---|---|
| 3,020,527 | 2/1962 | MacLaren | 324/207.17 |
| 3,891,918 | 6/1975 | Ellis . | |
| 4,408,159 | 10/1983 | Prox | 324/236 |
| 4,555,120 | 11/1985 | Frait et al. | 324/207.2 |
| 4,839,590 | 6/1989 | Koski et al. | 324/207.13 |
| 5,017,867 | 5/1991 | Dumais et al. | 324/207.24 |
| 5,036,275 | 7/1991 | Manch et al. | 324/207.24 |
| 5,054,785 | 10/1991 | Hansen | 324/207.16 |
| 5,216,364 | 6/1993 | Ko et al. | 324/207.24 |

FOREIGN PATENT DOCUMENTS

| 1232931 | 12/1984 | U.S.S.R. | 324/239 |
|---|---|---|---|

*Primary Examiner*—Walter E. Snow
*Attorney, Agent, or Firm*—Watts, Hoffmann, Fisher & Heinke Co., L.P.A.

[57] ABSTRACT

A linear position sensor includes coextensively positioned primary and secondary windings, each having an elongated core and a coil radially spaced around the core. A cyclically varying signal is applied to the primary winding which develops a signal across the secondary winding due to transformer coupling. A coupling adjustment member varies the amount of transformer coupling and is longitudinally movable with respect to the winding assembly. The relative longitudinal positioning of the coupling member with respect to the winding assembly is determined by measuring the signal developed across the secondary winding. In one embodiment, the windings are similarly configured, are arranged side-by-side and spaced apart; the coupling adjustment member enhances the transformer coupling between the windings which are telescopingly received within the member. In another embodiment, one winding is concentrically positioned within the other and the coupling adjustment member disrupts the transformer coupling between the windings by being positionable in a gap between the windings. Embodiments are illustrated both for location internal to, and external of, a vehicle shock absorber.

16 Claims, 9 Drawing Sheets

LINEAR POSITION SENSOR

This is a continuation of Ser. No. 08/069,127, filed May 28, 1993, now abandoned, which is a continuation of Ser. No. 07/296,183, filed Jan. 11, 1989, now U.S. Pat. No. 5,216,364.

BACKGROUND OF THE INVENTION

This invention relates to a position sensor and in particular to a sensor of the type that senses the relative longitudinal displacement of two members by applying a signal to a sensor probe and measuring an electrical parameter that varies in proportion to the relative displacement of two portions of the probe.

Automotive ride control systems provide active suspension response to road conditions by reacting to forces tending to compress the suspension members. In order to accomplish this, it is necessary to provide a real time measurement of the position of various portions of the suspension system, such as each wheel assembly, with respect to the vehicle frame. Those relative position variables are provided as an input to a ride control computer, which dynamically responds by adjusting the fluid pressure in the respective shock absorbers.

One preferred location for such a position sensor is internal to the associated shock absorber, where the movement of each wheel assembly may be monitored by the relative movement of the telescoping shock absorber members. The environment internal to a shock absorber is extremely hostile, subjecting an internally mounted sensor to pressures of up to 6500 psi and temperatures of up to 135° C. Accordingly, a linear position sensor located internal to a shock absorber must be compact and extremely rugged and durable in nature. Even when located external of the shock absorber, such a position sensor used with an automotive ride control system will be exposed to a severe environment which requires that the sensor be resistant to degradation by various automotive fluids and be extremely stable under wide swings in ambient temperature. Additionally, to be successful in the automotive field, such a position sensor must necessarily be inexpensive to produce, be reliable in performance and experience very little wear over extended periods.

SUMMARY OF THE INVENTION

According to one aspect of the present invention, a linear position sensor system includes a sensor having primary and secondary windings, and coupling adjustment means movable with the member whose position is to be sensed for varying the transformer coupling between the windings. Each of the windings has an elongated core and a coil radially wound around the core. Each of the coils includes a multiplicity of turns spaced substantially along the entire length of the respective core. The cores are substantially coextensively positioned.

The system further includes circuit means including means for applying a cyclically varying signal to the primary winding and measuring means for measuring the signal developed across the secondary winding, which is coupled in from the primary winding. As the coupling adjustment means is repositioned or displaced along with the member whose position is being sensed, the change in transformer coupling between the windings causes the signal developed across the secondary winding to vary proportionately to the amount of displacement to provide a representation of the position of the sensed member.

The radially wound coils provide the capability for adjusting or tuning the linearity of the sensor output by allowing the relative spacing between the coil turns to be selectively positioned along the length of the core. Furthermore, the use of substantially coextensive elongated core members, which are substantially covered with the coil turns, provides signal response for over 90 per cent (90%) of the stroke length of the sensor probe portions.

According to another aspect of the invention, a linear position sensor system includes a sensor member and an electronic assembly connected therewith and having a sine wave generator for exciting the sensor and measuring means for measuring an electrical parameter of the sensor. The position sensor system further includes means movable with the member whose position is to be sensed for proportionately adjusting the value of the sensor electrical parameter. The sine wave generator includes a square wave generator for developing a square wave signal and a low pass filter for converting the square wave generator output to a low-distortion sine wave.

A sine wave generator, according to this aspect of the invention, has exceptional temperature stability by making use of the amplitude and frequency stability inherent in a square wave generator. Additionally, an electronic assembly provided according to this aspect of the invention may be made exceptionally compact. The compactness of the electronic assembly, along with the exceptional temperature stability of the sine wave generator, facilitates the incorporation of the entire electronic control circuit into a compact unit which may be packaged, along with the sensor member, in an individual. Unit which may be located in a harsh environment. A linear position sensor system, according to this aspect of the invention, may receive unfiltered DC voltage from the vehicle electrical system and produce a DC output signal proportional to the position of the member being sensed. The system is a compact unit which may be directly connected with a ride control computer without requiring "match-up adjustments," or calibration, between the position sensor and the computer. Therefore, any calibration may be carried out in the factory and the sensor system may be placed or replaced on the vehicle in the factory or in the field and connected to the ride control computer without field calibration that is commonplace on prior art position sensors.

A linear position sensor according to the invention is capable of compact configuration and rugged construction in order to function in the harsh environment of a vehicle ride control system. In one embodiment of the invention, one movable portion of the sensor probe includes coextensive primary and secondary windings that are parallel and spaced apart. The other movable portion of the sensor probe includes a coupling adjustment means that is a coupling-enhancing member positioned around both coils, such that the signal developed in the secondary coil increases as the coupling adjustment means becomes more coextensive with the windings. In another embodiment of the invention, the coextensive primary and secondary windings are concentrically positioned and separated by an annular cavity or gap. The coupling adjustment means includes a coupling disrupter member which is positioned between the windings in the gap such that the presence of the coupling adjustment means decreases the transformer coupling between the windings, which causes the signal developed across the secondary winding to decrease as the coupling adjustment means becomes more coextensive with the windings. In yet another embodiment of the invention, which is intended to be positioned externally of the vehicle shock absorber, the coupling adjustment member includes an inner metallic member fitted within an outer support member and antifriction means between the outer support member and a tubular-shaped bore. The windings are positioned in the bore and the coupling adjustment member is longitudinally slidable therein.

It is thus seen that the present invention is capable of a wide range of applications and variations. These and other related objects, advantages, and features of this invention will become apparent upon review of the following specification in conjunction with the drawings.

DESCRIPTION OF THE PREFERRED EMBODIMENT

Figure 1:
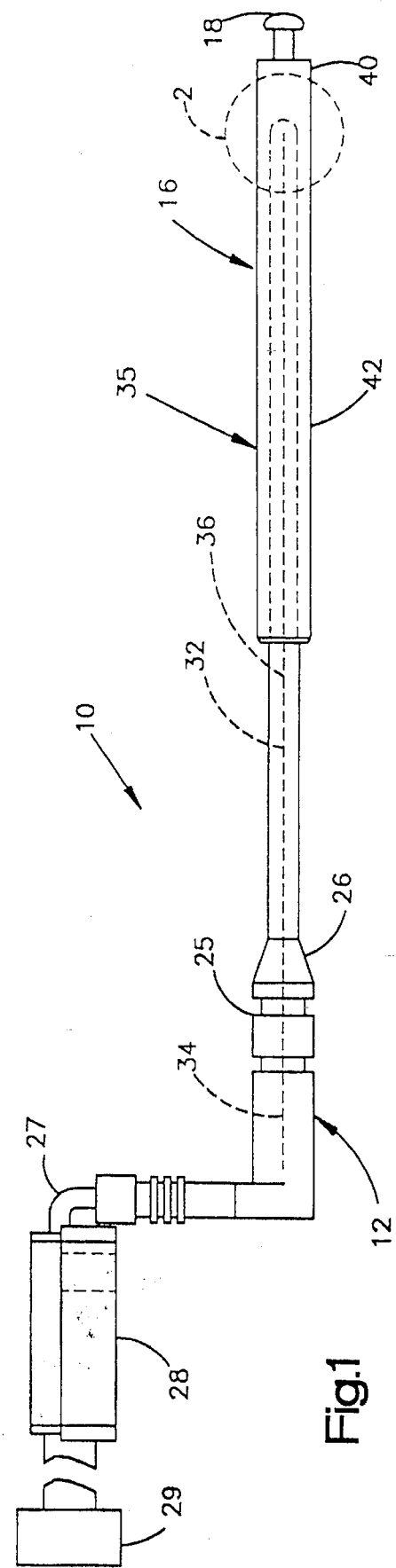
FIG. 1 is a sectional side view of a non-contact linear position sensor according to one embodiment of the invention.

Referring now specifically to the drawings, and the illustrative embodiments depicted therein, a non-contact linear position sensor assembly generally illustrated at 10 includes a base portion 12 attached to one portion of a vehicle, such as the portion of a shock absorber attached to the vehicle chassis, and a tracking portion 16 which is attached to a portion of the vehicle whose position it is desired to sense, such as the portion of a shock absorber attached to a wheel support assembly (FIG. 1). Tracking and base portions 16 and 12 are relatively longitudinally movable with respect to each other and may be positioned internal to or external of the corresponding shock absorber.

Sensor assembly 10 further includes a control module 28 interconnected With base portion 12 by a cable 27. An electrical connector 29, adapted to engage a mating connection (not shown) for connection to the ride control computer, provides input and output interconnection for control module 28. Base portion 12 includes a shield member 26 defining an internal circular chamber in which a winding assembly 32 is firmly positioned. Winding assembly 32 includes an end portion 34 positioned within an enlarged portion 25 of shield member 26 and a sensing portion 36 positioned within a narrowed portion of shield member 26. Enlarged portion 25 is configured for mounting to and penetrating through an end member of a shock absorber (not shown). Tracking portion 16 includes an end portion 40 and a transformer coupling adjustment means comprising an elongated tubular portion 42. Tubular portion 42 has an inner diameter selected to freely slide over sensing portion 36 of the winding assembly 32. End portion 40 includes an attachment member 18 for attachment of tracking portion 16 to the portion of the vehicle whose position it is desired to sense. Sensing portion 36 and tubular portion 42 cooperate to form a sensor probe designated 35. The relatively movable portions of the sensor probe may be assembled with closely controlled dimensional tolerances and, if positioned within a shock absorber, the hydraulic fluid internal to the shock absorber may provide a lubricious sliding interfit between these movable portions.

Figure 2:
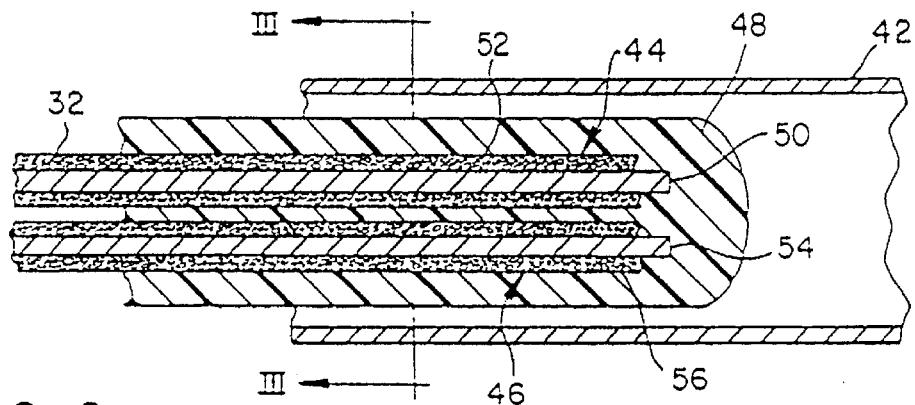
FIG. 2 is an enlarged partial view of the area indicated at II in FIG. 1.
Figure 3:
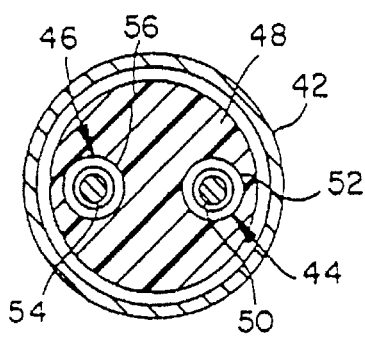
FIG. 3 is a sectional view taken along the lines III—III in FIG. 2.

Winding assembly 32 includes a primary winding 44 and a secondary winding 46 which is mutually encapsulated within encapsulating material 48 (FIGS. 2 and 3). Primary and secondary windings 44 and 46 are coextensive, or side-by-side, for substantially their entire length which spans winding assembly 32 and are generally mutually parallel and spaced apart. Primary winding 44 includes an elongated cylindrical core 50 and a coil 52 defined by a single magnet wire radially wound around core 50 over substantially the entire length of the core. Secondary winding 46 includes an elongated cylindrical core 54 having a coil 56 defined by a single magnetic wire radially wound around core 54 over substantially its entire length. In one preferred embodiment, cores 50 and 54 are 0.05-inch diameter ferromagnetic rods insulated with a 0.002-inch Teflon coating or other insulating material and are 7.2 inches in length. Coils 52 and 56 include a double layer of 41-AWG and 43-AWG wire, respectively, compactly wound on the associated insulated core which produces an inductance of 3 to 4 milihenries for each coil. Primary and secondary windings 44 and 46 are each covered by a protective film such as a Mylar sleeve (not shown), and are mutually encapsulated by a material 48 which, in the illustrated embodiment, is a liquid crystal polymer, such as Celanese Corporation Vectra B-130.

Tubular portion 42 of tracking portion 16 surrounds a varying length of the coextensive, spaced, parallel primary and secondary windings 44 and 46 and provides a transformer coupling adjustment member for the windings, which are configured as a transformer. In the embodiment illustrated in FIGS. 1–3, tubular portion 42 is a transformer coupling enhancing member which increases the transformer coupling between the primary and secondary windings as the sensing portion 36 and tubular portion 42 become more telescopingly coextensive, as a result of movement of the vehicle wheel assembly closer to the vehicle frame. In the illustrated embodiment, tubular member 42 is a nonferrous metal, such as aluminum, which enhances transformer coupling between the primary and secondary windings through a radially looping current that is developed in the tubular portion as a result of excitation of the primary winding.

Figure 4:
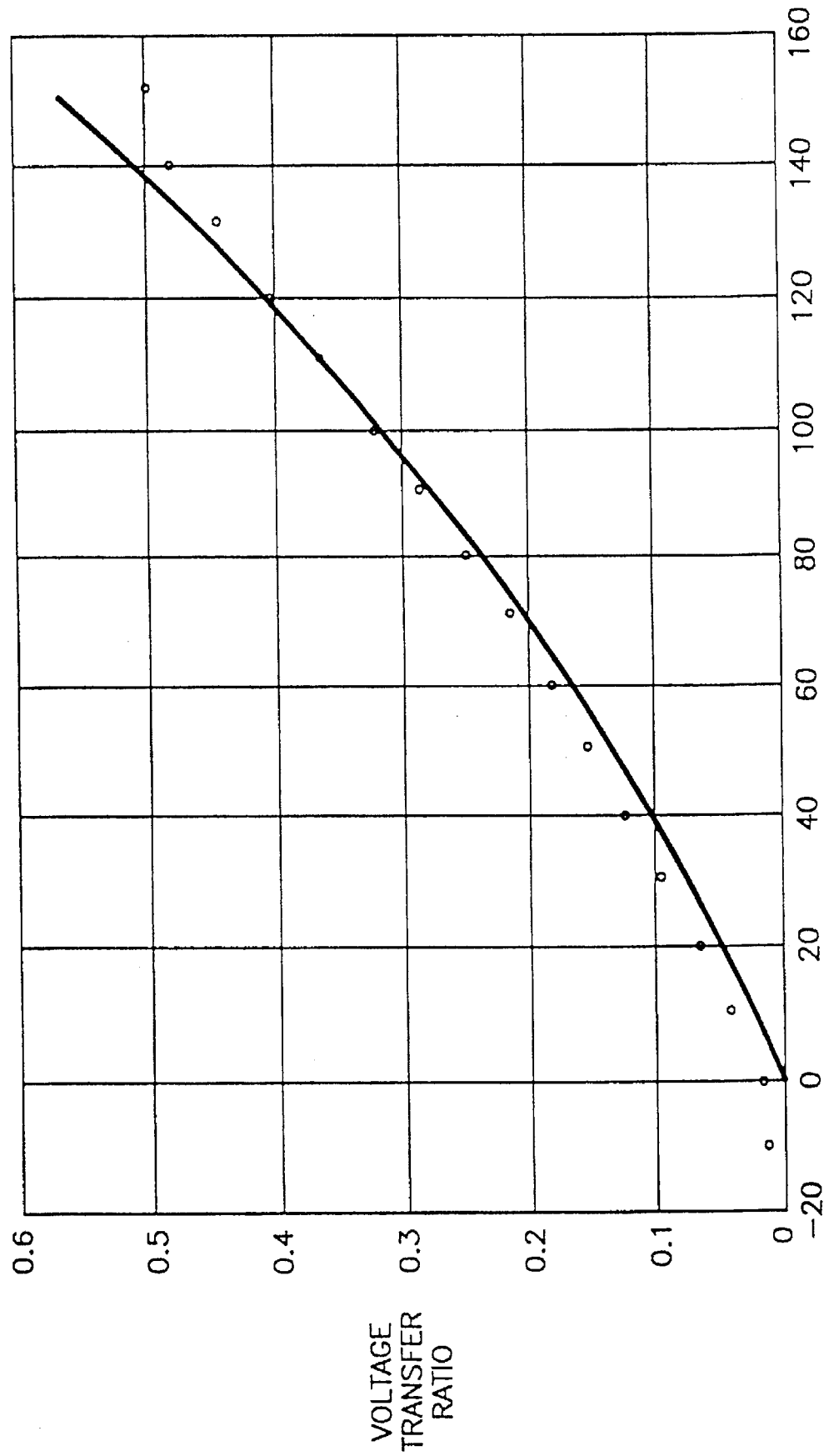
FIG. 4 is a graphic diagram of the voltage transfer ratio as it relates to the relative position of portions of a sensor probe according to the embodiment in FIG. 1.

The results obtained by this embodiment of the invention are illustrated in FIG. 4. By reference to this figure, it is seen that the signal developed across the secondary winding, which is directly proportional to the voltage transfer ratio, is substantially linearly related to the amount of overlap of tubular portion 42 with respect to sensing portion 36 of the winding assembly. Furthermore, an important feature of the present invention is that the radially wound coils may be wound with a pre-established non-constant turn spacing, by a commercially available numerically controlled winding apparatus, in a manner that may substantially cancel any remaining nonlinearity and is within the capabilities of one skilled in the art. Alternatively, it may be desired to provide a particular characteristic nonlinear voltage transfer ratio for a particular application. The turn spacing may be arranged in order to "tune" the voltage transfer ratio to the desired characteristic.

Figure 5:
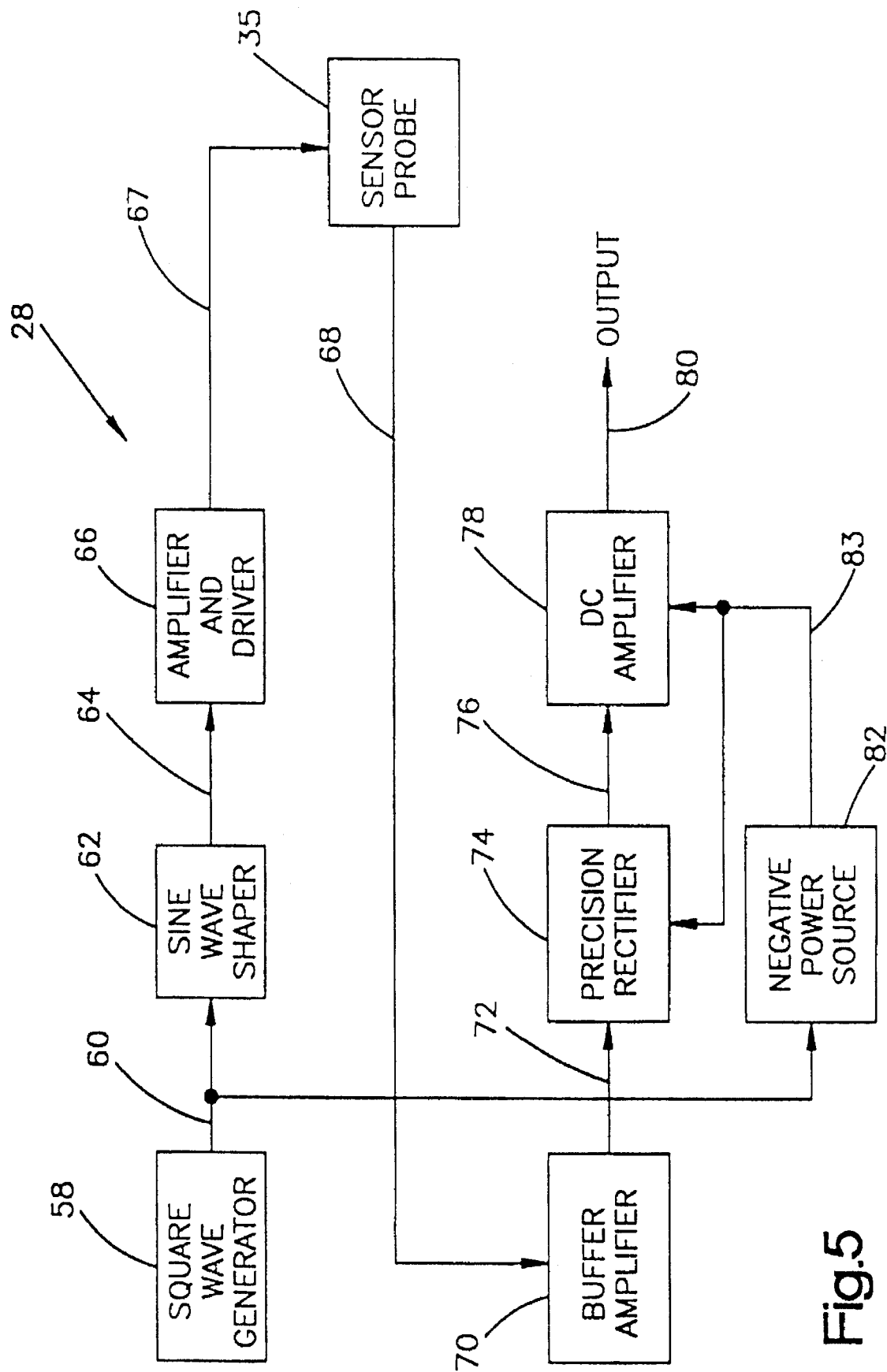
FIG. 5 is an electrical circuit diagram in block form of the electrical control circuit of the invention.

With reference to FIG. 5, organization of the control module 28 will be described. A square wave generator 58 produces a square wave signal on its output line 60. The square wave signal, which operates at 12.8 KHz in the illustrated embodiment, is provided as an input to a sine wave shaper circuit 62 which converts the square wave signal to a low-harmonic distortion sine wave signal having the same frequency which is provided on its output 64. The sine wave signal is amplified by an amplifier and driver circuit 66 and is provided on line 67 to the primary winding 44 of sensing probe 35. The sine wave signal provided to the primary winding is coupled to the secondary winding in proportion to the relative longitudinal overlap of the winding assembly and the coupling adjustment portion of the sensor probe. The signal developed across the secondary winding is provided on line 68 to a buffer amplifier 70, which provides a high input impedance for and amplifies the relatively small signal developed across the secondary winding. Buffer amplifier 70 additionally includes means for eliminating induced high frequency noise and any DC offset. The output 72 of the buffer amplifier is provided to a precision rectifier 74 which produces a DC analog voltage on its output 76, proportional to the average AC voltage developed across the secondary winding. The DC analog voltage is amplified by amplifier 78 and provided by an output line 80 as an input to a ride control computer of the vehicle (not shown).

Output 60 of square wave generator 58 is additionally provided as an input to a negative power source 82 which produces a voltage on its output 83 which is negative with respect to the vehicle chassis ground and is provided as an additional supply voltage to precision rectifier 74 and DC amplifier 78. The purpose of supplying these portions of the control module with a negative voltage, which is normally not available in a vehicle electrical system, in addition to the conventional positive supply voltage, is to improve the linearity of the output signal, especially at low signal levels, while allowing the DC offset of the sensor output to be adjusted to a desired level, which may be zero or even a negative voltage. Additionally, by supplying a voltage to the precision rectifier and the DC amplifier that is negative with respect to chassis ground, means are provided for detecting certain internal failures of these circuit portions by monitoring the polarity of the voltage on output 80. If the polarity of the output becomes more negative than a predetermined level, an indication is provided to the ride control computer that the position sensor is malfunctioning.

Figure 6:
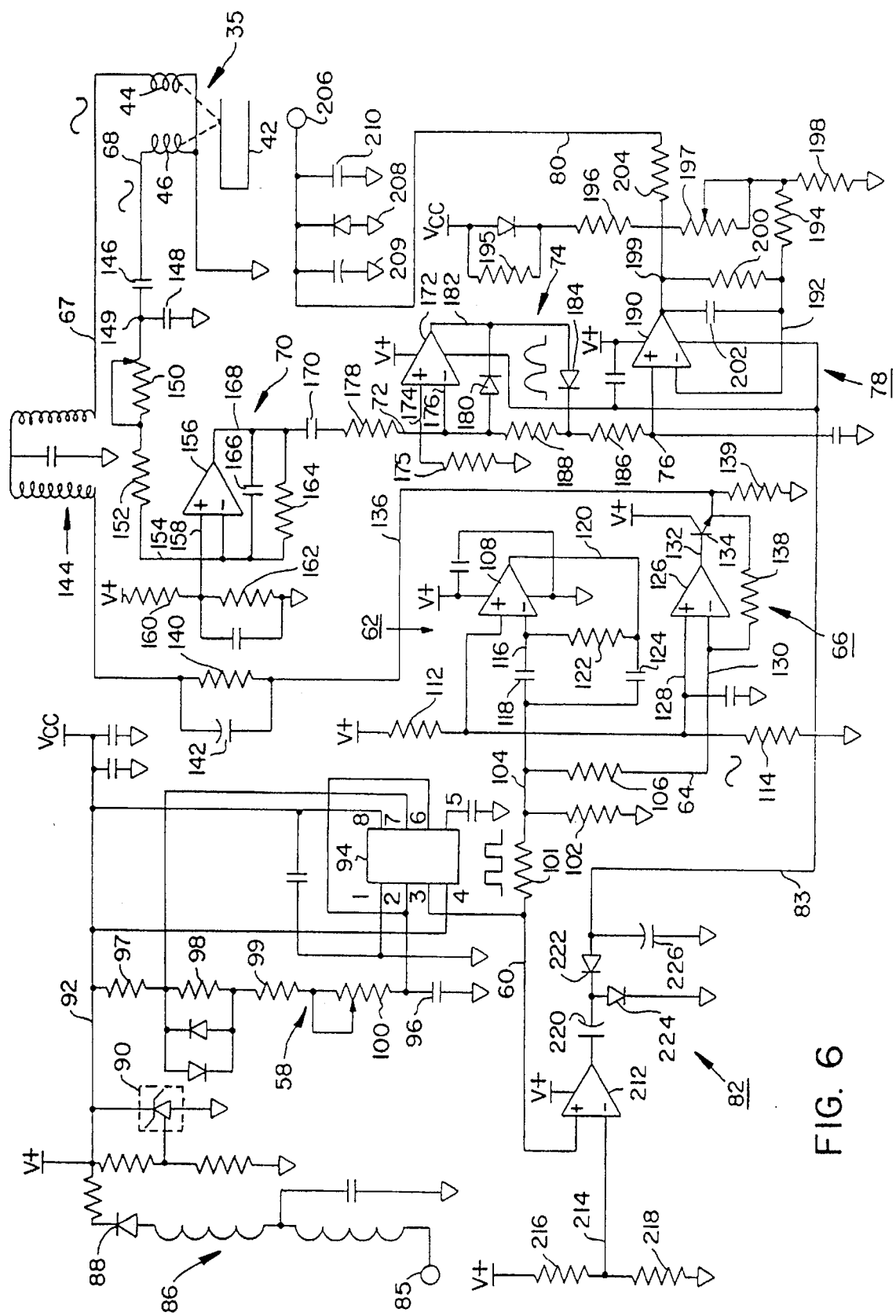
FIG. 6 is an electrical circuit diagram in schematic form of the control circuit in FIG. 5.
Figure 7:
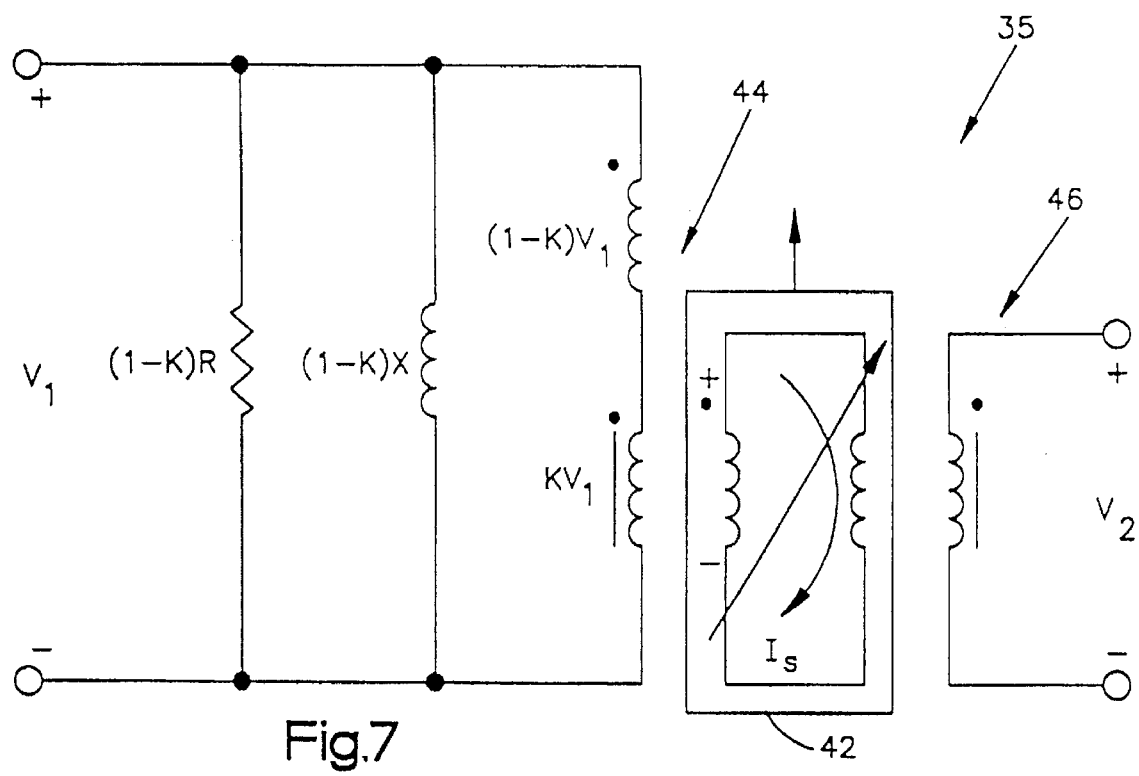
FIG. 7 is a diagram illustrating the equivalent circuit for a sensor probe according to the embodiment in FIGS. 1–6.

A detailed description of this embodiment of the electrical control system is provided by reference to FIG. 6. The vehicle supply voltage is connected to the control system on pin 85 of connector 29 and is conditioned by an input filter 86 and reverse polarity protection diode 88. The conditioned supply voltage is regulated to a constant voltage VCC by a voltage regulation means 90, which may be of any such means well-known in the art and is illustrated as a precision shunt reference device. The voltage VCC is produced on a bus 92 and is provided as a supply voltage to selected components in the circuit.

Square wave oscillator 58, in the illustrated embodiment, is a type 555 CMOS timer 94 having a frequency established at 12.8 KHz by a capacitor 96 connected between a timing terminal of timer 94 and signal ground and in series connection with resistors 97 through 100 and VCC bus 92. One of the resistors 100 is adjustable to provide factory adjustment of the frequency of timer 94. As is recognized by one skilled in the art, CMOS timer 94 provides a stable frequency and amplitude source over a wide range of temperature conditions. The output from timer 94 on line 60 is scaled by a pair of precision resistors 101 and 102, connected in a voltage divider arrangement, and provided on line 104. Line 104 is provided as an input 64 to amplifier and driver circuit 66 through a resistor 106. The characteristics of the signal on line 104 are significantly altered by sine wave shaper 62 which is connected between line 104 and ground and serves as an "active load" low-pass filter to shunt the high frequency harmonics of the square wave signal to ground. This allows substantially only the low frequency component of the square wave, which is a sine wave having a frequency equal to the pulse repetition rate of the square wave generator, to pass to the sensor probe.

Sine wave shaper 62 includes an operational amplifier 108 having a non-inverting input on line 110 held at a constant voltage provided by a voltage divider consisting of resistors 112 and 114 series connected between a positive DC power source V+ and signal ground. Amplifier 108 further includes an inverting input 116 connected with line 104 through a capacitor 118. Amplifier 108 produces an output on a line 120, which is connected with inverting input 116 through a resistor 122 and with line 104 through a capacitor 124. The particular configuration for sine wave shaper 62 causes it to actively shunt higher frequency components of the square wave to ground by the particular feedback arrangement between output line 120 and inverting input 116 including resistor 122 and capacitors 118 and 124, while providing a relatively high impedance to the base frequency of the square wave produced by timer 94 and serving to shape the signal. Accordingly, the resulting signal is a sine wave having a frequency equal to that of the pulse repetition rate of timer 94.

The sine wave signal is provided through a resistor 106 to line 64 as an input to amplifier and driver 66. Amplifier and driver 66 includes an operational amplifier 126 having a non-inverting input 128 provided with a constant voltage level from the voltage divider formed by resistors 112 and 114 and an inverting input 130 connected with input line 64 and provided with the sinusoidal signal previously described. Amplifier 126 includes an output 132 connected directly with the base terminal of a transistor 134 whose collector is connected directly with V+ and whose emitter is connected with a line 136. A feedback resistor 138 connects line 136 with inverting input 130 to establish the combined gain of amplifier 126 and transistor 134 and to cause this combination to operate as a linear amplifier. A resistor 139 between line 136 and signal ground provides a load for amplifier 126 and provides noise suppression of high frequency signals induced from external sources.

Line 136 is connected to a parallel combination of a resistor 140 and a capacitor 142. The purpose of the parallel combination is to reduce the DC component of the signal provided to the primary winding 44 while coupling the AC component of the signal to the primary winding. Resistor 140 may be a varistor in order to compensate for the effect of temperature variations on the DC resistance of primary winding 44. The parallel combination of capacitor 142 and resistor 140 are connected through a filter circuit 144 to one terminal of primary winding 44, the other terminal of which is connected to signal ground.

The excitation of primary winding 44, by the previously described circuity, creates a magnetic flux which is coupled by coupling adjustment means 42 to secondary winding 46 which will cause a signal to develop across the secondary winding. Winding 46 is connected between line 68 and signal ground. Line 68 is connected to one terminal of a series capacitor 146 in order to couple only the AC components of the signal developed across secondary winding 46 to the remaining portions of the circuit. A second terminal 149 of capacitor 146 is connected to a capacitor 148 which provides a high frequency shunt to ground to reduce high frequency noise induced into the sensing probe windings. Terminal 149 is connected to the input of buffer amplifier 70 through a series combination of a gain-adjusting resistor 150 and a resistor 152.

Buffer amplifier 70 includes an amplifier 156 having an inverting input 154 to receive the signal from resistor 152. Amplifier 156 further has a non-inverting input 158 connected to a constant voltage source, provided by a voltage divider consisting of resistors 160 and 162 connected in series between V+ and signal ground in order to impart a fixed DC bias to the signal. A feedback circuit, consisting of a parallel combination of a resistor 164 and capacitor 166, is connected between output 168 of the amplifier and its inverting input 154. In this configuration, buffer amplifier 70 provides a high input impedance for the low signal level developed across the secondary winding 46 and amplifies the signal. The output of amplifier 70 is AC coupled by a series capacitor 170 and resistor 178 to input 72 of precision rectifier 74.

Precision rectifier 74 includes an operational amplifier 172 having a non-inverted input 174 connected to ground through a resistor 175 and an inverting input 176 connected to input line 72. A diode 180 is provided as a feedback path between output 182 and input 176 of amplifier 172 and serves to cause amplifier 172 to conduct positive going portions of the AC signal but to not conduct the negative going portions. In addition, output 182 is further connected through a forward biased diode 184 and a resistor 186 to output line 76. Diode 184 is additionally connected to inverting input 176 through a resistor 188. This configuration provides a forward voltage drop that is substantially reduced from that of a conventional rectifier by essentially dividing the forward voltage drop by the open loop gain of amplifier 172. Additionally, this configuration provides exceptional temperature stability through the use of a pair of oppositely poled diodes in the feedback loop.

Line 76 from the precision rectifier 74 is provided to DC amplifier 78, which includes an amplifier 190. Output 76 is connected to the non-inverting input of amplifier 190. An inverting input 192 of amplifier 190 is connected through a series resistor 194 to a voltage divider consisting of resistors 195, 196, 197 and 198 serially connected between VCC and signal ground. Resistor 197 is adjustable and provides means for adjusting the DC offset on the output of amplifier 190, which is provided on line 199. A parallel combination of a resistor 200 and capacitor 202 is connected as a feedback path between output 199 and inverting input 192 and establishes the gain characteristics of amplifier 190 while providing low pass filtering characteristics to reduce AC ripple on output line 199. Output 199 of DC amplifier 78 is connected through a resistor 204 to output line 80 which is, in turn, connected to an output pin 206 of connector 29. A diode 208 between output line 80 and signal ground provides a reverse voltage clamp to eliminate excessive negative voltage swings that otherwise could be passed to the ride control computer. Additional low pass output filtering is provided by capacitors 209 and 210.

Output 60 of square wave generator 58 is additionally connected to the non-inverting input of an amplifier 212 whose inverting input 214 is maintained at a constant voltage level by a voltage divider comprising resistors 216 and 218 connected in series between VCC and ground. Amplifier 212 provides a low impedance source for providing a cyclically varying signal to a rectifier circuit 82 including series capacitor 220, series diode 222, shunt diode 224 and shunt capacitor 226. The output of rectifier circuit 82 is provided on line 83 as a DC voltage which is negative with respect to signal ground. Negative voltage line 83 is provided as a supply voltage to amplifiers 172 and 190 in addition to the positive voltage supplied to these amplifiers from V+. In this manner, amplifiers 172 and 190 are capable of operating in a linear region even at small signal levels and the DC offset on output line 199 of amplifier 190 may be adjustable to zero and even a negative voltage, if desired. An additional advantage of providing a negative voltage supply to amplifiers 172 and 190 is that an internal failure of either amplifier may result in a negative voltage in output line 199 which could be interpreted by the ride control computer as an indication of a malfunctioning of the control module.

OPERATION

In operation, a square wave of stable frequency and amplitude is produced by square wave generator 58 on line 60, which includes a low frequency component and harmonically-related higher frequency components, and is scaled by resistors 101 and 102. The scaled square wave is converted to a low-distortion sine wave by the active-load, high frequency shunt action of sine wave shaper 62. Sine wave shaper 62 provides a low-impedance shunt for the higher frequency components and a high-impedance load to the low frequency signal component of the square wave, as well as serves to refine the shape of the resulting signal. Therefore, a low distortion, stable amplitude sine wave is produced. This sine wave signal is amplified by amplifier and driver 66 and is provided to primary winding 44 through resistor 140, capacitor 142 and filter 144.

The excitation of primary winding 44 induces a radially looping current in tubular portion 42. In turn, the looping current in tubular portion 42 causes a voltage to be induced in secondary winding 46 that is proportional to the length of sensing portion 36 that is telescoped within tubular portion 42. Thus, tubular portion provides the transformer coupling between the primary and secondary windings. The voltage developed across secondary winding 46 is amplified by buffer amplifier 70 and rectified to a DC level, equal to the average value of the AC signal, by precision rectifier 74. The output of precision rectifier 74 is amplified and further filtered by amplifier 78. The gain of the control module may be adjusted by adjusting resistor 150 and the offset of the output signal on pin 206 may be adjusted by adjusting resistor 197.

The effect of tubular portion 42 on the sensing portion 36 of the winding assembly is illustrated by reference to FIG.

7, in which:

K represents the forward voltage transfer ratio

R is the effective probe input resistance

X is the effective probe input reactance $V_1$ is the input voltage signal provided to the primary winding 44

$V_2$ is the output voltage signal developed across the secondary winding 46.

$I_s$ is the looping current induced in tubular member 42. Windings 44 and 46 are long, slender coils. A current in such a coil causes a magnetic flux that is dense inside the coil and decreases with distance rapidly outside of the coil. Therefore, except for the effect of tubular portion 42, essentially no signal $V_2$ would be developed across winding 46 in response to the excitation of winding 44 because the windings are side-by-side. As tubular portion 42 overlaps a portion of the winding assembly, the magnetic flux produced by the primary winding is cut by the tube wall, which induces a radial current in the tube. This induced current produces a flux within the tube, which is opposite to and partially cancels the primary flux. If the counter-flux is, for example, 0.3 times the original flux in the primary coil, the flux within the primary coil will be at its original amplitude within the non-overlapped length, but at only 70% of its original amplitude within the overlapping portion. This will reduce both R and X, which will respond as though the overlapped portion of the primary winding were partially shorted, or removed from the circuit.

Since the same length of secondary winding 46 is within tubular portion 42, this portion of the secondary winding will experience, in this example, a flux that is 30% of the original flux amplitude in the primary while the non-covered portion of the secondary will experience essentially no flux. $V_2$ is directly proportional to $V_1$ times the ratio of flux in the secondary to the flux in the primary. The result is a voltage induced across the secondary that is proportional to the length of the winding assembly that is within the tubular portion 42.

FIRST ALTERNATIVE EMBODIMENT

A first alternative embodiment of the invention is illustrated in FIGS. 8–12, in which the primary and secondary windings are concentrically positioned and separated by an annular cavity, or gap, and in which the coupling adjustment means includes a coupling disrupter member longitudinally positionable between the windings in the gap. In this embodiment, as the coupling adjustment means and the sensing probe become more telescopingly coextensive, the voltage developed across the secondary winding, as a result of the voltage applied to the primary winding, decreases because the coupling adjustment means inhibits, or reduces, the amount of transformer coupling between the windings.

Figure 10:
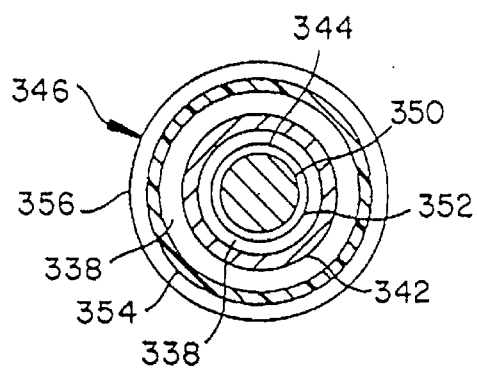
FIG. 10 is a sectional view taken along the lines X—X in FIG. 9.
Figure 9:
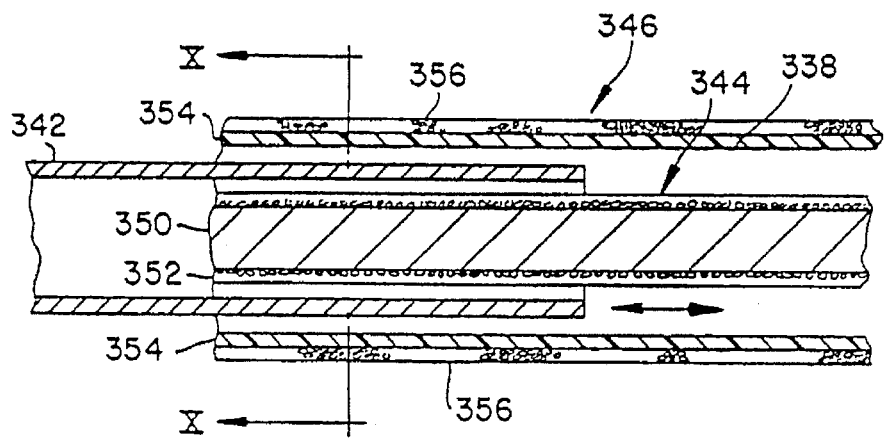
FIG. 9 is an enlarged view of the area designated IX in FIG. 8.
Figure 8:
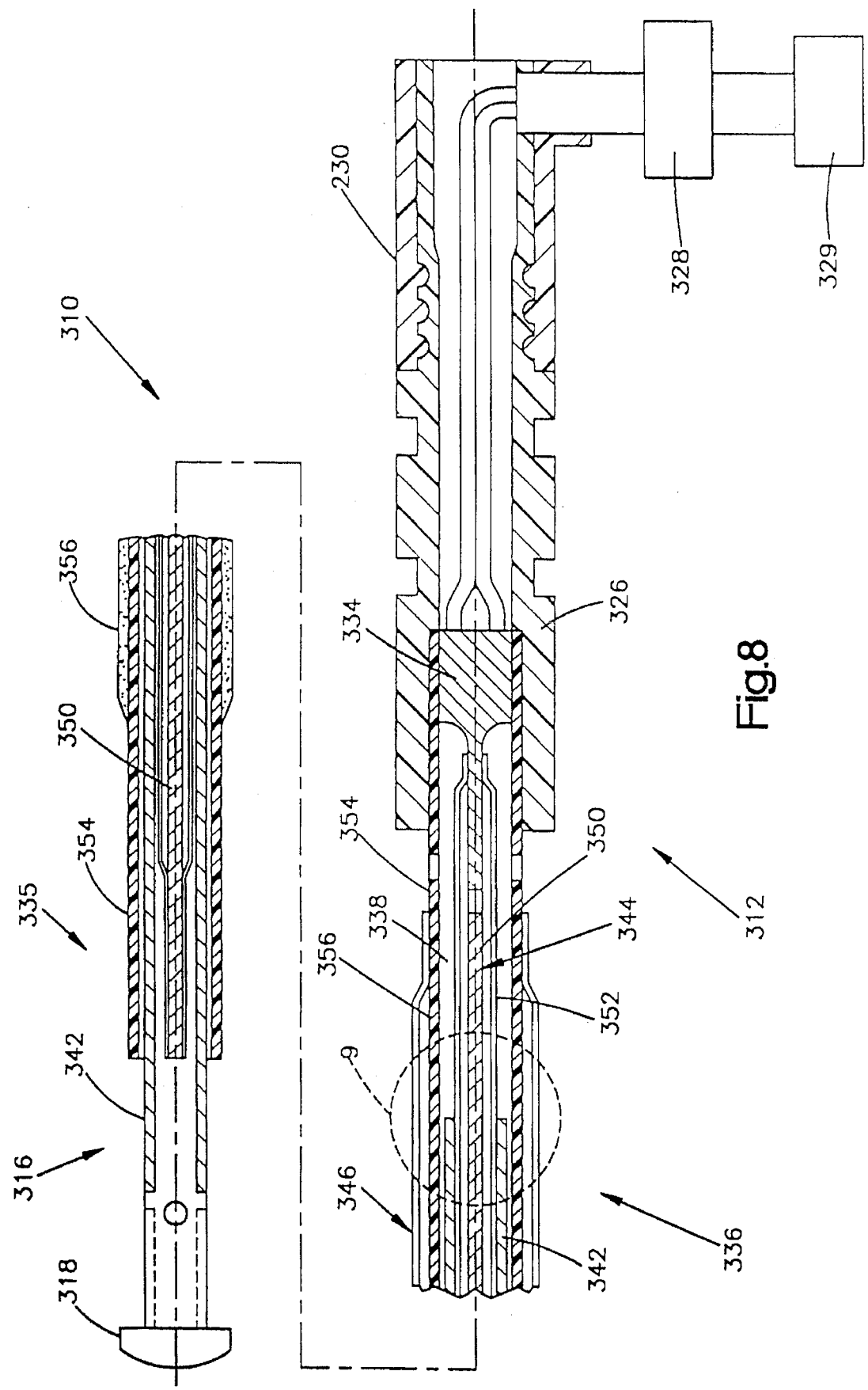
FIG. 8 is a sectional side view of a second embodiment of the invention.

In this embodiment, a non-contact linear position sensor assembly 310 includes a base portion 312 and a tracking portion 316, which are mutually longitudinally telescopingly positionable with respect to each other (FIG. 8). Base portion 312 includes attachment means (not shown) for attachment thereof to a stationary portion of the vehicle and tracking portion 316 includes attachment means 318 for attachment to a movable portion of the vehicle, such as a wheel assembly. Base portion 312 includes a sensing portion 336 including a primary winding 344 comprising a coil 352 radially wound around a core 350 (FIGS. 8, 9 and 10). Primary winding 344 is concentrically positioned within a secondary winding 346 which includes a core 354 having a wall defining a central bore that has an inner diameter that is substantially larger than the outer diameter of core 350. Secondary winding 346 further includes a coil 356 radially wound around core 354. The dimensions of the primary and secondary windings are selected in order to define an annular cavity or gap 338 between the concentrically positioned windings. A tubular portion 342 of tracking portion 316 is longitudinally positionable within gap 338. Tubular portion 342 and sensing portion 336 define a sensing probe 335.

Core 350 includes an enlarged end portion 334 which is sized to frictionally engage core 354 which, in turn, is sized to frictionally engage a frame member 326 included in base portion 312 (FIG. 8). Position sensor 310 further includes a stress relief member 230 which engages frame 326 and supports a plurality of electrical leads extending to a control module 328 which, in turn, is connected by an electrical connector 329 to the ride control computer (not shown).

Core 350 is made from a ferromagnetic material, such as iron, and the secondary core 354 is made from a non-magnetic material, such as a structural polymer. As best seen in FIG. 8, the primary and secondary coils do not extend the entire length of their respective cores. Rather, the coils are positioned on their respective cores in a manner that will provide interface between the coupling means and the coils over the entire extent of travel of tubular portion 342, plus an additional length of the core equal to approximately 10 percent of the inner primary coil and 5 percent of the outer secondary coil. Primary and secondary windings are each radially wound around their respective cores from a single length of wire and are each covered by a protective film such as a Mylar sleeve or other insulating material.

Figure 12:
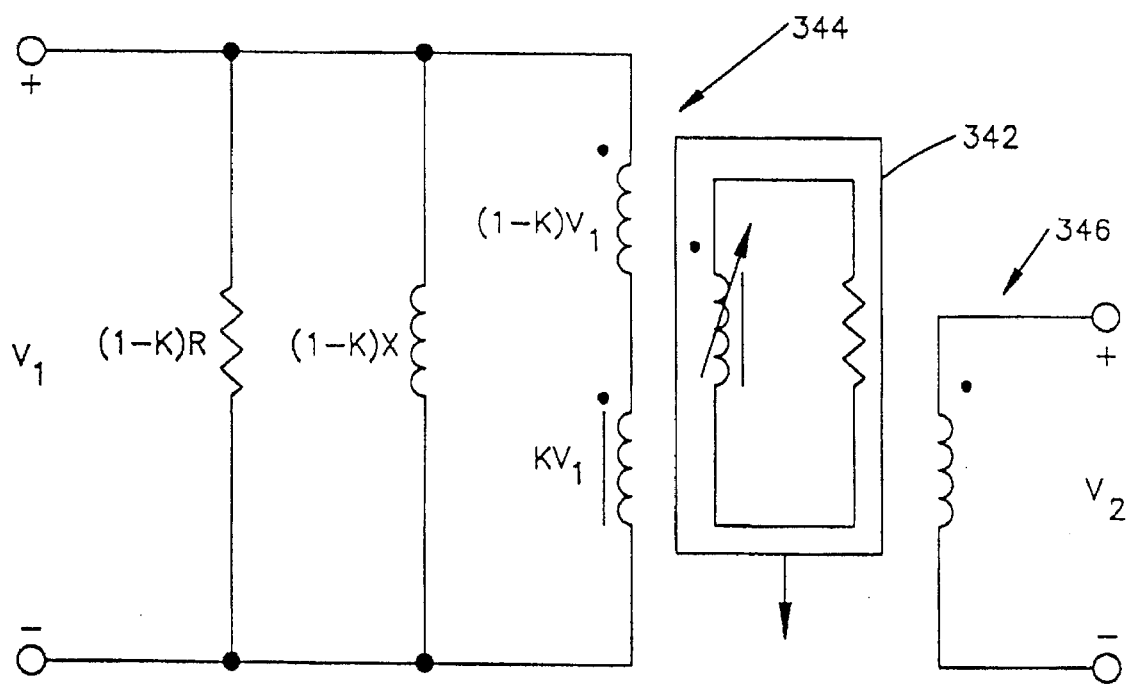
FIG. 12 is a diagram illustrating the equivalent circuit for a sensor probe according to the embodiment in FIGS. 8–10.

Because primary winding 344 is positioned within secondary units 346, excitation of the primary winding by a voltage $V_1$ induces a voltage $V_2$ in the secondary winding (FIG. 12). The coupling adjustment member in this embodiment, which is defined by tubular portion 342, operates as a magnetic shield which interrupts this transformer coupling between primary winding 344 and secondary winding 346. Tubular portion 342 operates as a short circuit winding, creating a variable reluctance path for the magnetic flux. This variable reluctance path proportionately decreases the amount of current induced into the secondary winding. The flux available for inducing a voltage in the secondary winding is proportional to the length of gap 338 in which the tubular portion 342 is absent. Accordingly, as tubular portion 342 is additionally telescopingly extended within gap 338, the magnetic shielding effect of the tubular portion reduces the magnetic coupling between the windings, which reduces the voltage developed across the secondary winding from the signal applied to the primary winding. Therefore, the output signal from the sensing probe responds to the relative positioning of the position sensor portions in the opposite manner to that described in the embodiment illustrated in FIGS. 1–5. In the illustrated embodiment, tubular portion 342 is made from a magnetic metal such as iron.

Figure 11:
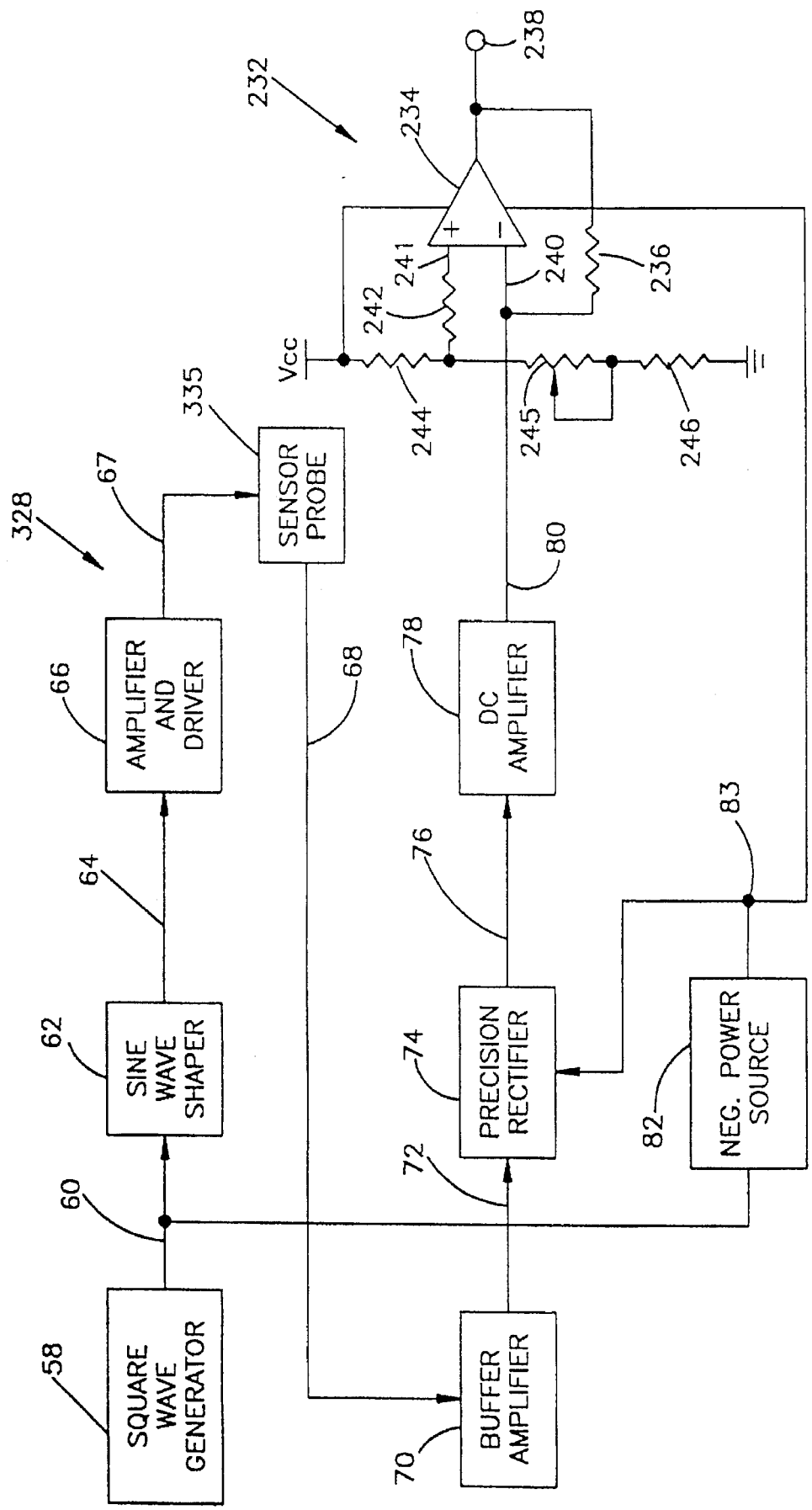
FIG. 11 is an electrical circuit diagram partially in block form and partially in schematic form of the control module of the embodiment illustrated in FIGS. 8–10.

The control module 328, provided with this embodiment, as illustrated in FIG. 11, is essentially the same as that disclosed in FIGS. 4 and 5, with the addition of an inverting amplifier 232 connected with the output 80 of DC amplifier 78. Inverting amplifier 232 includes an operational amplifier 234 having a feedback resistor 236 extending between an output 238 of the amplifier and an inverting input 240, in order to establish its gain. The non-inverting input 241 of amplifier 232 is provided with a constant voltage level through a voltage divider, comprising resistors 244, 245 and 246 series connected between VCC and ground, and a series resistor 242. In the embodiment illustrated in FIG. 11, resistor 245 is adjustable. Amplifier 234 is supplied with both a positive voltage V+ and a negative voltage, the latter from line 83. The operation of the control module illustrated in FIG. 11 is essentially the same as that illustrated in FIGS. 5 and 6. However, the output 80 of amplifier 78 is further amplified and inverted due to the inclusion of an additional output stage including inverting amplifier 234.

SECOND ALTERNATIVE EMBODIMENT

Figure 13:
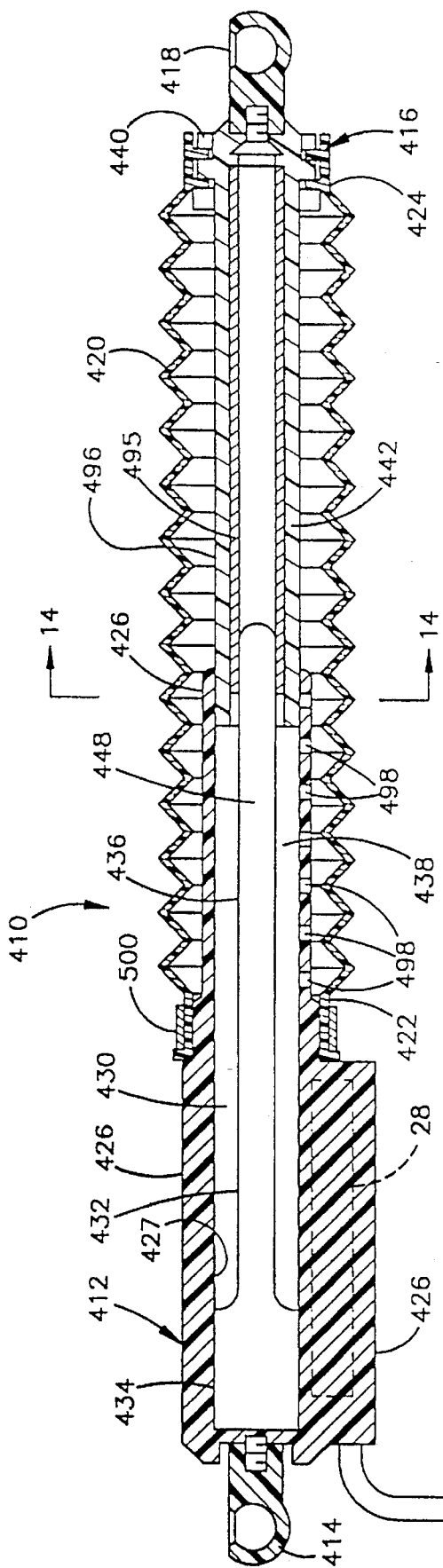
FIG. 13 is a sectional side view of a third embodiment of the invention.
Figure 14:
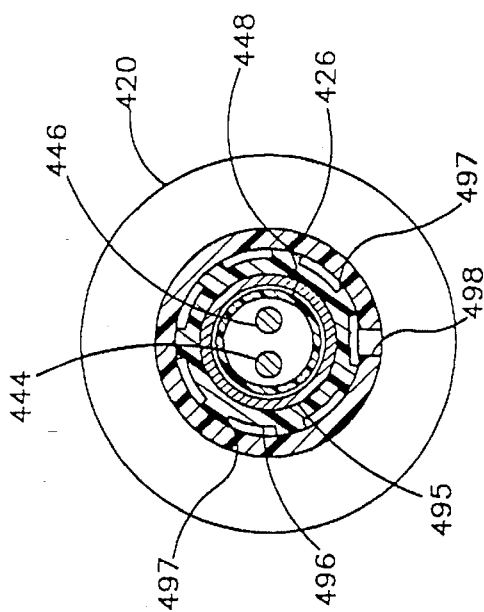
FIG. 14 is an enlarged sectional view taken along the lines XIV—XIV in FIG. 13.

An embodiment of the invention adapted for use with a vehicle ride control system but positioned externally of the corresponding shock absorber is illustrated in FIGS. 13 and 14. This embodiment has the same electrical configuration and operates in the same manner as the embodiment illustrated in FIGS. 1–7 with the principal exception that the length of the primary and secondary winding is reduced to 4.8 inches in the illustrated embodiment.

A linear position sensor assembly generally illustrated at 410 includes a base portion 412 attached by an attachment member 414 to one portion of a vehicle, such as the vehicle chassis, and a tracking portion 416 which is attached to the portion of the vehicle whose position it is desired to sense, such as a wheel support assembly by a second attachment member 418 (FIG. 13). Tracking and base portions 416 and 412 are relatively longitudinally movable with respect to each other and are flexibly closed by a longitudinally flexible boot 420. Boot 420 includes a first end 422 sealingly engaged with base portion 412 by any suitable clamping means, such as a cable tie 500 and a second end 424 sealingly engaged with tracking portion 416 by any suitable clamping means, such as a cable tie (not shown).

Base portion 412 includes a frame 426 and a control module 28 incorporated within frame 426 in a common package such as by encapsulation with a suitable encapsulating material that is resistant to various automotive fluids. An electrical connector 429 adapted to engage a mating connector (not shown) for connection to the ride control computer provides input and output interconnection for control module 28. Frame 426 includes an inner surface 427 defining an internal circular chamber 430 in which a winding assembly 432 is firmly positioned. Winding assembly 432 includes primary and secondary windings 444 and 446 that are enclosed by a structural polymer shell 448 and has an end portion 434 dimensioned to frictionally engage surface 427. Winding assembly 432 further has a sensing portion 436 spaced from surface 427 to define an annular cavity or gap 438 therebetween. Tracking portion 416 includes an end portion 440 to which attachment member 418 is affixed and coupling adjustment means comprising an elongated tubular portion 442.

Tubular portion 442 is configured to freely slide within gap 438 between sensing portion 436 of the winding assembly 432 and surface 427. Tubular portion 442 includes a nonferrous metal transformer coupling member 495 tightly fitted within a polymeric support tube 496. A plurality of ribs 497 are annularly spaced around the outer surface of tube 496 and provide low friction guide means for slidable engagement with surface 427 (FIG. 14). A plurality of openings 498 extend through a wall portion of frame 426 and provide air flow means for equalizing the pressure within gap 438 as tubular portion 442 longitudinally moves therein.

The value of various components in the illustrated embodiment of control module 28 (FIG. 6) are as follows:

| Reference Number | Value |
| --- | --- |
| Resistor 101 | 15K, 1% |
| Resistor 102 | 5.11K, 1% |
| Resistor 112 | 110K |
| Resistor 114 | 24K |
| Capacitors 118, 124 | 0.0022 uf, NPO type |
| Resistor 122 | 10K, 1% |
| Resistor 139 | 10K |
| Resistor 140 | 180 |
| Capacitor 142 | 4.7 uf |
| Capacitor 146 | 0.1 uf |
| Capacitor 148 | 0.001 uf |
| Resistor 160 | 180K |
| Resistor 162 | 100K |
| Resistor 164 | 274K, 1% |
| Capacitor 166 | 10 pf, NPO type |
| Capacitor 170 | 0.1 uf |
| Resistor 175 | 1K |
| Resistor 178 | 1K, 1% |
| Resistor 186 | 10K, 1% |
| Resistor 188 | 2.1K, 1% |
| Resistor 194 | 47.5K, 1% |
| Resistor 195 | 237 |
| Resistor 196 | 2.1K, 1% |
| Resistor 198 | 200, 1% |
| Resistor 200 | 274K, 1% |
| Capacitor 202 | 680 pf |
| Capacitor 209 | 1 uf |
| Capacitor 210 | 0.001 uf |

CONCLUSION

The present invention is readily adaptable to low cost automated assembly. The windings may be radially positioned on the respective cores merely by rotating of the cores while applying the wire turns by a numerically controlled apparatus. The output characteristics of the sensor assembly, with respect to the relative positioning of the sensor probe portions, may be adjusted by selectively adjusting the turn-spacing of the coils along various portions of the respective cores. This versatility allows the position sensor to be "tuned" to the characteristics of a particular vehicle's suspension system. The ability to combine the packaging of the sensing probe and electronic module allows adjustments to the electronic circuitry, such as gain and offset, to be made at the factory before the components are encapsulated. Thereafter, the position sensor assembly may be easily positioned on the vehicle and connected to the ride control computer without additional adjustment in the field. The structure of the various components additionally reduces weight and bulk and enhances the durability of the assembly. The unique aspects of the control module according to the invention provides a reduced component count which further improves the compactness of the assembly and, along with the superior temperature stability of the circuit, allows an entire sensor probe to be positioned within a harsh environment. Furthermore, the components of the sensor probe are adapted to a lubricious sliding interfit provided by the hydraulic fluid of a shock absorber in which it is intended to be located in certain embodiments.

A linear position sensor assembly according to the invention may be made responsive over 90 percent of the stroke length of the tracking portion with respect to the base portion. Thus, space occupied by the assembly is substantially reduced. In addition to positioning within a shock absorber, the invention may be adapted to mounting external to a shock absorber parallel to the direction of its travel. The invention may additionally find application in sensing the position of portions of an automotive vehicle other than the suspension system and may be applied to non-vehicular uses such as use with machine tools and the like.

Other changes and modifications in the specifically described embodiments can be carried out without departing from the principles of the invention which is intended to be limited only by the scope of the appended claims, as interpreted in accordance with the principles of patent law, including the doctrine of equivalents.

The embodiments of the invention in which an exclusive property or privilege is claimed are defined as follows:

1. A position sensor for providing a signal indicative of the relative position of movable members comprising:

an elongated sensor housing supporting an elongated sensor having a conductive coil that is radially wound about an axis and that extends through a length of the elongated sensor housing;

an elongated coupling member having an outer surface that is sized for insertion and slidable movement within the elongated sensor housing to slide in and out of the sensor housing over a range of travel along the elongate dimension of the sensor housing, and to overlap a variable portion of the elongated sensor contained in the sensor housing;

a control module housing electronically coupled to the elongated sensor housing, said control module containing a sensor control module having i) a signal generator for electrically energizing the conductive coil with an alternating sensor energization signal to create a magnetic field in a region of the conductive coil of said elongated sensor and ii) an output circuit electrically coupled to the elongated sensor for converting an alternating output from the elongated position sensor into an analog position signal output that is functionally related to an extent of overlap of the coupling member with the elongated sensor as the elongated coupling member intercepts the magnetic field set up by energization of the conductive coil;

a generally tubular shaped flexible boot with one end sealingly joined around an outer surface of one end of the coupling member and the other end of the boot sealingly joined around an outer surface of the elongated sensor housing;

a first mounting fixture joined to an end of the elongated sensor housing spaced from the flexible boot having a socket that is designed to mount one end of said position sensor onto one movable member adapted to receive the first fixture;

a second mounting fixture joined to a non-insertion end of the coupling member having a socket that is designed to mount the other end of said position sensor onto another movable member adapted to receive the second fixture; and a wire harness coupled to the sensor control module housing including conductors for energizing the signal generator of the sensor control module and routing the analog position output signal away from the control module housing.

2. The position sensor of claim 1 where said sensor control module comprises circuitry that senses the depth of insertion of said coupling member into said elongated sensor housing and thereby deduces the degree of separation between said first and second mounting fixtures and wherein the wire harness comprises a conductor for transmitting an output signal related to the depth of insertion.

3. The position sensor of claim 1 where said elongated coupling member is a tube comprised of aluminum.

4. The position sensor of claim 1 where each of said first and second mounting fixtures comprises a split spherical socket having an entry opening that has a diameter smaller than an internal diameter of the split spherical socket.

5. The position sensor of claim 1 where each of said first and second mounting fixtures comprises a split spherical socket having an entry opening that has a diameter smaller than the internal diameter of the split spherical socket and
where said socket is composed of a rigid but elastic material such as plastic to allow said socket opening to stretch and widen the opening and then reforms to its unstretched state.

6. The position sensor of claim 1 where said elongated coupling member comprises a polymeric support tube coupled to said second mounting fixture that overlies a nonferrous metal coupling member.

7. The position sensor of claim 1 wherein said sensor control module is encapsulated in said control module housing in a material that inhibits moisture from contacting said sensor control module.

8. The position sensor of claim 1 further including damping means for sealingly joining one end of the flexible boot around the outer surface of one end of the elongated coupling member and sealingly joining the other end of the flexible boot around an outer surface of the elongated sensor housing.

9. The position sensor of claim 8 wherein the clamping means for at least one end of the flexible boot includes an annular band overlying and exerting pressure on a circumferential portion of the flexible boot at or near the end of the boot.

10. The position sensor of claim 9 wherein the clamping means further includes at least one of the elongated sensor housing and elongated coupling member having one or more raised annular ridges on its outer surface, the ridges engaging and exerting pressure on inner circumferential portions of the flexible boot overlying the ridges.

11. The position sensor of claim 1 further including structure defining one or more apertures in fluid communication with an interior region enclosed by the flexible boot as the coupling tube slides in and out of the sensor housing.

12. The position sensor of claim 1 further including structure defining one or more apertures in fluid communication with an interior region enclosed by the flexible boot for equalizing pressure as the coupling member slides in and out of the elongated sensor housing and further including clamping means for sealingly joining one end of the flexible boot around the circumference of one end of the coupling member and sealingly joining the other end of the flexible boot around the surface of the elongated sensor housing and wherein the clamping means for at least one end of the flexible boot includes an annular band overlying and exerting pressure on a circumferential portion of the flexible boot at or near the end of the boot.

13. The position sensor of claim 1 further including structure defining one or more apertures in fluid communication with an interior region enclosed by the flexible boot for equalizing pressure as the coupling member slides in and out of the elongated sensor housing and further including clamping means for sealingly joining one end of the flexible boot around the circumference of one end of the coupling member and sealingly joining the other end of the flexible boot around the surface of the elongated sensor housing and wherein the clamping means for at least one end of the flexible boot includes an annular band overlying and exerting pressure on a circumferential portion of the flexible boot at or near the end of the boot and further wherein at least one of the elongated sensor housing and coupling member includes one or more raised annular ridges on its outer circumference, the ridges engaging and exerting pressure on inner circumferential portions of the flexible boot overlying the ridges.

14. A position sensor for providing a signal indicative of the relative position of movable members comprising:

- an elongated sensor housing supporting an elongated sensor having a conductive coil that is radially wound about an axis and that extends through a length of the elongated sensor housing;
- an elongated coupling member having an outer surface that is sized for insertion and slidable movement within the elongated sensor housing to slide in and out of the sensor housing over a range of travel along the elongate dimension of the sensor housing, and to overlap a variable portion of the elongated sensor contained in the sensor housing;
- a sensor control module housing containing a sensor control module having i) a signal generator for electrically energizing the conductive coil with an alternating sensor energization signal to create a magnetic field in a region of the conductive coil and ii) an output circuit electrically coupled to the elongated sensor for converting an alternating output from the elongated position sensor into an analog position signal output that is functionally related to an extent of overlap of the coupling member with the elongated sensor as the elongated coupling member intercepts the magnetic field set up by energization of the conductive coil;
- a generally tubular shaped flexible boot with one end sealingly joined around an outer surface of one end of the coupling member and the other end of the boot sealingly joined around an outer surface of the elongated sensor housing;
- a first mounting fixture joined to an end of the elongated sensor housing spaced from the flexible boot having a socket that is designed to mount one end of said position sensor onto one movable member adapted to receive the first fixture;
- a second mounting fixture joined to a non-insertion end of the coupling member having a socket that is designed to mount the other end of said position sensor onto another movable member adapted to receive the second fixture; and
- a wire harness for energizing the signal generator of the sensor control module and routing the analog position output signal from the output circuit away from the control module housing;
- said position sensor including structure defining one or more apertures in fluid communication with an interior region enclosed by the flexible boot as the coupling member slides in and out of the sensor housing.

15. The position sensor of claim 14, further including damping means for sealingly joining one end of the flexible boot around the circumference of one end of the coupling member and sealingly joining the other end of the flexible boot around the surface of the elongated sensor housing and wherein the clamping means for at least one end of the flexible boot includes an annular band overlying and exerting pressure on a circumferential portion of the flexible boot at or near the end of the boot.

16. A position sensor for providing a signal indicative of the relative position of movable members comprising:

- an elongated sensor housing supporting an elongated sensor having a conductive coil that extends through a length of the elongated sensor housing;
- an elongated coupling member having an outer surface that is sized for insertion and slidable movement within the elongated sensor housing to slide in and out of the sensor housing over a range of travel along the elongate dimension of the sensor housing, and to overlap a variable portion of the elongated sensor contained in the sensor housing;
- a control module housing electrically coupled to the elongated sensor housing that supports a sensor control module having i) a signal generator for electrically energizing the conductive coil with an alternating sensor energization signal to create a magnetic field in a region of the conductive coil and ii) an output circuit electrically coupled to the elongated sensor for converting an alternating output from the elongated position sensor into an analog position signal output that is functionally related to an extent of overlap of the coupling member with the elongated sensor as the elongated coupling member intercepts the magnetic field set up by energization of the conductive coil;
- a generally tubular shaped flexible boot with one end sealingly joined around an outer surface of one end of the coupling member and the other end of the boot sealingly joined around an outer surface of the elongated sensor housing;
- a first mounting fixture joined to an end of the elongated sensor housing spaced from the flexible boot having a socket that is designed to mount one end of said position sensor onto one movable member adapted to receive the first fixture;
- a second mounting fixture joined to a non-insertion end of the coupling member having a socket that is designed to mount the other end of said position sensor onto another movable member adapted to receive the second fixture; and
- a wire harness coupled to the sensor control module housing including conductors for energizing the signal generator of the sensor control module and routing the analog position output signal away from the control module housing.

* * * * *